US010166858B2

United States Patent
Ibañez Moreira et al.

(10) Patent No.: US 10,166,858 B2
(45) Date of Patent: Jan. 1, 2019

(54) SHUTTER DEVICE FOR A FRONT GRILLE OF A VEHICLE

(71) Applicant: BATZ, S.COOP., Igorre (ES)

(72) Inventors: Jesùs Ibañez Moreira, Derio (ES); Iñaki Aguirre Pichel, Santurtzi (ES)

(73) Assignee: BATZ, S.COOP., Igorre (ES)

( * ) Notice: Subject to any disclaimer, the term of this patent is extended or adjusted under 35 U.S.C. 154(b) by 0 days.

(21) Appl. No.: 15/487,990

(22) Filed: Apr. 14, 2017

(65) Prior Publication Data

US 2017/0297424 A1    Oct. 19, 2017

(30) Foreign Application Priority Data

Apr. 19, 2016   (EP) .................................... 16382177

(51) Int. Cl.
| | | |
|---|---|---|
| *B60K 11/00* | (2006.01) | |
| *B60K 11/08* | (2006.01) | |
| *F16H 37/12* | (2006.01) | |

(52) U.S. Cl.
CPC ............ *B60K 11/085* (2013.01); *F16H 37/12* (2013.01); *Y02T 10/88* (2013.01)

(58) Field of Classification Search
CPC ....... B60K 11/085; B60K 11/06; B60K 11/04; B60K 11/08; F16H 37/12; F16H 37/122; F16H 37/124; F01P 7/02; F01P 7/10; F01P 7/00
See application file for complete search history.

(56) References Cited

U.S. PATENT DOCUMENTS

| | | | |
|---|---|---|---|
| 5,141,026 A | 8/1992 | Collette | |
| 7,866,737 B2* | 1/2011 | Browne | F24F 13/1426 296/193.1 |
| 8,118,124 B2* | 2/2012 | Shin | F01P 7/12 180/68.1 |
| 8,960,343 B2* | 2/2015 | Asano | B60K 11/04 180/68.1 |

(Continued)

FOREIGN PATENT DOCUMENTS

| | | |
|---|---|---|
| DE | 102011006114 A1 | 9/2012 |
| DE | 102011055394 A1 | 5/2013 |

(Continued)

OTHER PUBLICATIONS

European Search Report in corresponding European Patent Application No. 16382177.0, dated Sep. 26, 2016.

*Primary Examiner* — James M Dolak
(74) *Attorney, Agent, or Firm* — Edell, Shapiro & Finnan, LLC

(57) ABSTRACT

A shutter device for a front grille of a vehicle including a structure and at least two flaps coupled in a pivoting manner to the structure. An actuator and a transmission mechanism coupled to the actuator are configured to transmit the movement of the actuator to the flaps to carry out a sequential opening of the at least two flaps. According to one embodiment the transmission mechanism includes one gear for each of the at least two flaps, each gear comprising a drive wheel coupled to the actuator and a driven wheel coupled to the respective at least two flaps. Each of the drive wheels and driven wheels includes a notched part and a blocking part that are distributed differently to cause a sequential opening and/or closing of the at least two flaps.

12 Claims, 10 Drawing Sheets

(56) References Cited

U.S. PATENT DOCUMENTS

| | | | | |
|---|---|---|---|---|
| 9,168,827 B2 * | 10/2015 | Povinelli | .............. | B60K 11/085 |
| 9,168,828 B2 * | 10/2015 | Bourqui | .................. | F16H 19/08 |
| 9,254,742 B2 * | 2/2016 | Chappex | .............. | B60K 11/085 |
| 9,272,614 B1 * | 3/2016 | Povinelli | .............. | B60K 11/085 |
| 9,447,719 B2 * | 9/2016 | Kiener | .................... | F01P 7/02 |
| 9,868,347 B2 * | 1/2018 | Boom | .................. | B60K 11/085 |
| 9,869,283 B2 * | 1/2018 | Boom | .................... | F02M 35/10 |
| 9,914,351 B2 * | 3/2018 | Kim | .................... | B60K 11/085 |
| 9,975,420 B2 * | 5/2018 | Boom | .................. | B60K 11/085 |
| 9,994,100 B1 * | 6/2018 | Del Gaizo | ........... | B60K 11/085 |
| 10,017,048 B2 * | 7/2018 | Manhire | .............. | B60K 11/085 |
| 10,024,560 B2 * | 7/2018 | Schneider | ............ | F24F 13/1426 |
| 10,029,558 B2 * | 7/2018 | Frayer, III | ............ | B60K 11/085 |
| 10,093,172 B2 * | 10/2018 | Yoo | ........................ | B60K 11/06 |
| 10,093,173 B1 * | 10/2018 | Frayer | .................. | B60K 11/085 |
| 10,100,707 B2 * | 10/2018 | Wolf | .................... | B60K 11/085 |
| 2010/0243352 A1 * | 9/2010 | Watanabe | ............ | B60K 11/085 180/68.1 |

FOREIGN PATENT DOCUMENTS

| | | | |
|---|---|---|---|
| EP | 0500430 A1 | 8/1992 |
| EP | 1522448 A1 | 4/2005 |
| EP | 2942222 A1 | 11/2015 |

\* cited by examiner

SHUTTER DEVICE FOR A FRONT GRILLE OF A VEHICLE

CROSS-REFERENCE TO RELATED APPLICATIONS

This application relates to and claims the benefit and priority to European Application No. EP16382177.0, filed Apr. 19, 2016.

TECHNICAL FIELD

The present invention relates to a shutter device for a front grille of a motor vehicle.

BACKGROUND

Shutter devices are known to be arranged between the front grille and the radiator of a vehicle. Said shutter devices control the passage of air from the front grille to the radiator, which is responsible for dissipating the heat from the engine of a vehicle according to the cooling needs of said engine.

Shutter devices allow reducing vehicle fuel consumption by optimizing the aerodynamics of the vehicle when the cooling needs of the engine allow it.

Shutter devices are known to comprise a frame and a plurality of flaps coupled in a pivoting manner to said frame and positioned so as to obtain the airflow required for cooling the radiator of the engine. These shutter devices also comprise an actuator and a transmission part for transmitting the movement of the actuator to the flaps.

In addition, shutter devices are known to allow the sequential opening of different flap groups. Being able to open one flap group while another flap group remains closed is advantageous in some situations. For example, when the engine is turned off it may be of interest to keep some flaps closed to keep the engine hot, but it may be of interest to open some of them so that the engine does not overheat.

Shutter devices are known to allow the sequential opening of different flap groups using one actuator for each flap group, such that the opening of said groups can be controlled independently.

Shutter devices are also known to allow the sequential opening of different flap groups with a single actuator. For example, patent document DE102011055394A1 discloses a shutter device comprising a plurality of flaps and an actuator coupled to a wheel. The lower flap is coupled to said wheel by means of a first lever whereas the rest of the flaps are coupled to said wheel by means of a second lever. The wheel comprises a first guiding groove in which an end of the first lever is arranged and a second guiding groove in which an end of the second lever is arranged. Since said grooves follow different paths, the movement transmitted by the levers to their respective flaps is different, and a sequential opening is therefore achieved.

SUMMARY OF THE DISCLOSURE

A shutter device is provided that comprises a structure and at least two flaps coupled in a pivoting manner to said structure and adapted for pivoting between an airflow blocking position and an open position.

The shutter device further comprises an actuator, and a transmission mechanism coupled to the actuator and adapted for transmitting the movement of the actuator to the flaps to carry out a sequential opening of said at least two flaps.

The transmission mechanism comprises one gear for each of said at least two flaps. Each gear comprises a drive wheel coupled to the actuator and comprising a notched part and a blocking part, and a driven wheel coupled to the corresponding flap and comprising a notched part and a blocking part. The notched parts of the drive wheel and the driven wheel are adapted for engaging one another such that the driven wheel can transmit the movement of the actuator to the respective flap, whereas the blocking parts of the drive wheel and the driven wheel are adapted so that the driven wheel is blocked by the drive wheel when said blocking parts interlock with one another.

The notched parts and the blocking parts of each gear are distributed differently so as to achieve the sequential opening of at least first and second flaps being associated with a different gear.

The sequential shutter device allows obtaining a sequential opening of the flaps in a simpler manner.

These and other advantages and features will become evident in view of the drawings and detailed description.

DETAILED DESCRIPTION

Figure 1:
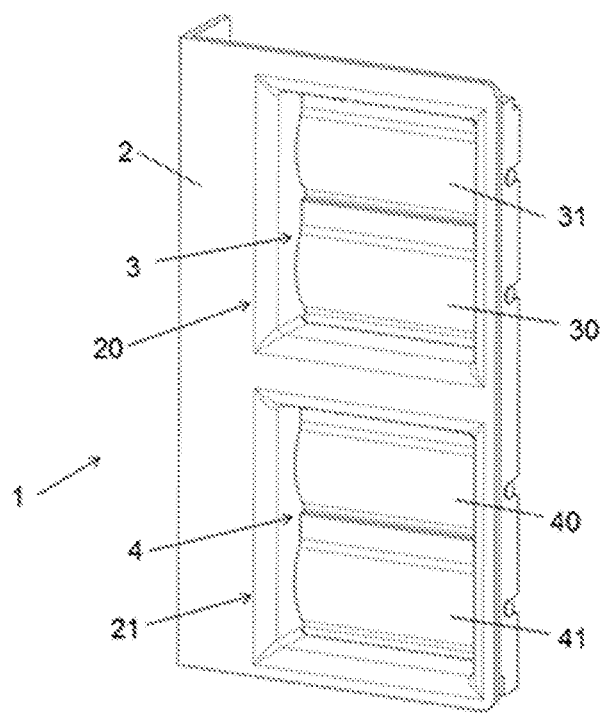
FIG. 1 shows a front view of the shutter device according to a first embodiment, wherein the flaps are in the airflow blocking position.

FIGS. 1 to 4 show a first embodiment of the shutter device 1 for a front grille of a motor vehicle.

The shutter device 1 of this embodiment is adapted for being arranged between the front grille and the engine of a vehicle. In other embodiments, the shutter device can be integrated in the actual front grille of the vehicle.

The shutter device 1 comprises a structure 2 and a plurality of flaps 30, 31, 40 and 41 coupled in a pivoting manner to said structure 2. The flaps 30, 31, 40 and 41 are adapted for pivoting between an airflow blocking position, in which the passage of air is not allowed, and an open position in which the passage of air is allowed. The shutter device 1 thereby controls the passage of air from the front grille to the radiator of the engine according to the cooling needs of the engine of the vehicle. Therefore, the shutter device 1 allows reducing vehicle fuel consumption by optimizing the aerodynamics of the vehicle, since when the cooling needs of the engine allow it, i.e., when the engine does not require airflow for cooling down, it blocks the passage of air reducing the aerodynamic drag of the vehicle. In contrast, when the engine requires air for cooling down, the shutter device 1 allows the passage of air, obtaining correct cooling of the engine.

Furthermore, the shutter device 1 allows the sequential opening of the flaps 30, 31, 40 and 41 such that the shutter device 1 can be better adapted to the cooling needs of the engine.

In this first embodiment, the shutter device 1 comprises a first flap group 3 and a second flap group 4. Each flap group 3 and 4 comprises two flaps 30, 31, 40 and 41. The flaps 30 and 31 of the first flap group 3 are coupled to one another and therefore pivot at the same time. Likewise, the flaps 40 and 41 of the second flap group 4 are coupled to one another and therefore pivot at the same time. According to some embodiments the flaps 30 and 31 of the first group 3 and the flaps 40 and 41 of the second group 4 do not pivot simultaneously, but rather sequentially, obtaining a sequential opening of the different flap groups 3 and 4.

Figure 2:
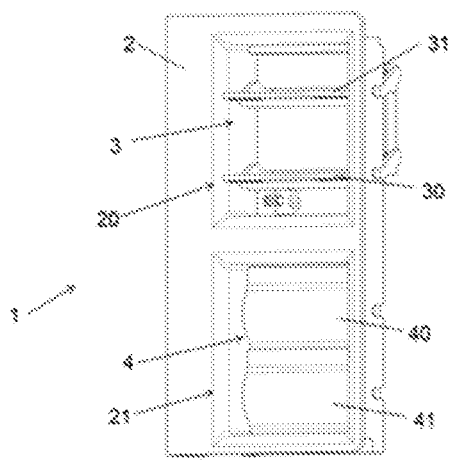
FIG. 2 shows a front view of the shutter device of FIG. 1, wherein the flaps of the first flap group are in the open position and the flaps of the second flap group are in the airflow blocking position.
Figure 3:
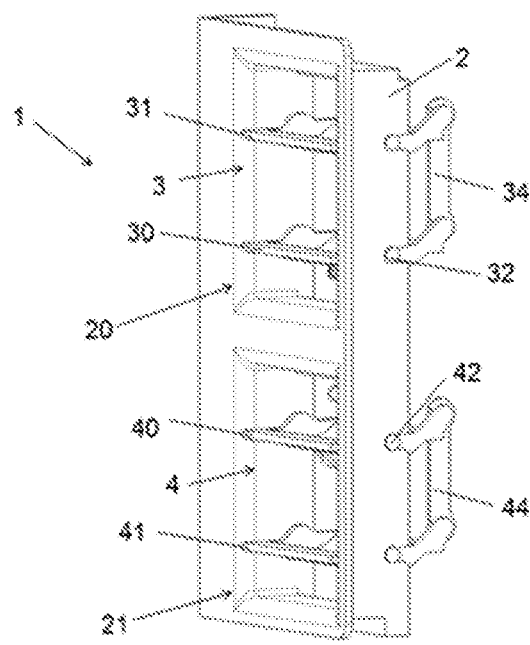
FIG. 3 shows a front view of the shutter device of FIG. 1, wherein all the flaps are in the open position.
Figure 4:
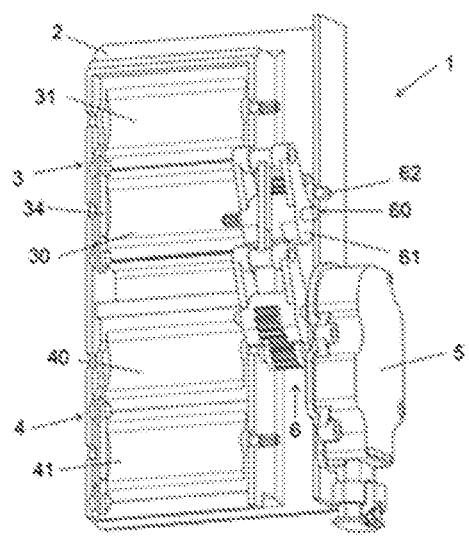
FIG. 4 shows a rear view of the shutter device of FIG. 1 with the actuator, wherein all the flaps are in the airflow blocking position.

FIG. 1 shows the shutter device 1 when all the flaps 30, 31, 40 and 41 are arranged in the airflow blocking position. FIG. 2 shows the shutter device 1 with the flaps 30 and 31 of the first flap group 3 in the open position, whereas the flaps 40 and 41 of the second flap group 4 remain in the blocking position. FIG. 3 shows the shutter device 1 when the flaps 30, 31, 40 and 41 of both flap groups 3 and 4 are in the open position.

Being able to open one flap group 3 while the other flap group 4 remains closed is advantageous in some situations. For example, when the engine is turned off it may be of interest to keep some flaps closed to keep the engine hot, but it may be of interest to open some of them so that the engine does not overheat.

In other embodiments, the shutter device can comprise more than two flap groups and/or each flap group can comprise more than two flaps. In other embodiments, instead of comprising flap groups, the shutter device can comprise at least two flaps rotating sequentially with respect to one another, or a combination of at least one flap and at least one flap group. A goal is to get at least two flaps of the shutter device to open in a sequential manner.

The structure 2 of the shutter device 1 of this first embodiment comprises an upper frame 20 in which the first flap group 3 is arranged, flaps 30 and 31 of said first flap group 3 being coupled in a pivoting manner to said upper frame 20. The structure 2 also comprises a lower frame 21 in which the second flap group 4 is arranged, flaps 40 and 41 of said second flap group 4 being coupled in a pivoting manner to said lower frame 21.

Figure 15:
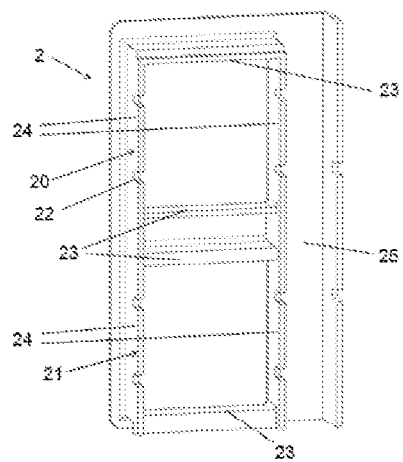
FIG. 15 shows a rear view of the structure of the shutter device of FIG. 1.

In this first embodiment each frame 20 and 21 of the structure 2, shown in detail in FIG. 15, comprises two longitudinal walls 23 and two transverse walls 24. Each frame 20 and 21 thus defines a rectangular opening bound by said longitudinal and transverse walls 23 and 24.

As previously described, the flaps 30, 31, 40 and 41 are coupled in a pivoting manner to said frames 20 and 21. To that end, in this first embodiment the frames 20 and 21 comprise coupling housings 22 in their transverse walls 24. Each flap 30, 31, 40 and 41 comprises at each end a fixing pin 32, 42 housed in respective coupling housings 22.

In other possible embodiments, the structure can comprise a plurality of frames that are arranged spaced from one another, at least one flap being arranged in each of said frames.

FIG. 1 shows the shutter device 1 when the flaps 30, 31, 40 and 41 are in the airflow blocking position. In this position, the flaps 30, 31, 40 and 41 completely cover the openings of the frames 20 and 21, preventing the air from going through the shutter device 1. In this first embodiment, in the blocking position, the flaps 30, 31, 40 and 41 are arranged perpendicular to the longitudinal walls 23 of the frames 20 and 21.

FIG. 3 shows the shutter device 1 when all the flaps 30, 31, 40 and 41 are in the open position. In this position, the air can go through the shutter device 1. In this first embodiment, in the open position, the flaps 30, 31, 40 and 41 are arranged parallel to the longitudinal walls 23 of the frames 20 and 21.

In this first embodiment, the flaps 30, 31, 40 and 41 also can assume intermediate positions between the blocking position and the open position.

Therefore, according to the cooling needs of the engine of the vehicle, i.e., according to the amount of air required, the flaps can pivot and be positioned more or less inclined with respect to the longitudinal walls 23.

To enable pivoting the flaps 30, 31, 40 and 41, the shutter device 1 comprises an actuator 5 and a transmission mechanism 6 for transmitting the movement of the actuator 5 to the flaps 30, 31, 40 and 41. In this first embodiment, the actuator 5 is arranged in a side column 25 of the structure 2. Control of the vehicle will order the actuator 5 of the shutter device 1 to perform the movements required for positioning the flaps 30, 31, 40 and 41 based on the cooling needs of the engine of the vehicle.

In this first embodiment, the transmission mechanism 6, shown in detail in FIGS. 5 to 10, comprises one gear 60 for each flap group 3 and 4. As previously mentioned, the transmission mechanism 6 allows the sequential opening of the flap groups 3 and 4 with a single actuator 5.

Figure 11:
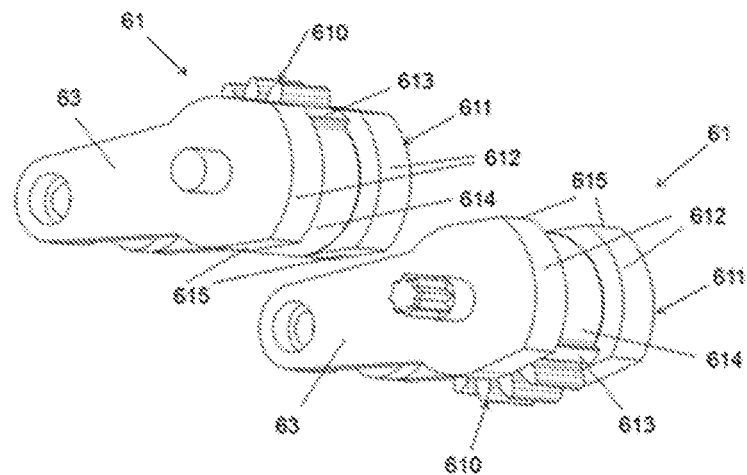
FIG. 11 shows a view of the drive wheels of the transmission mechanism of the shutter device of FIG. 1.
Figure 12:
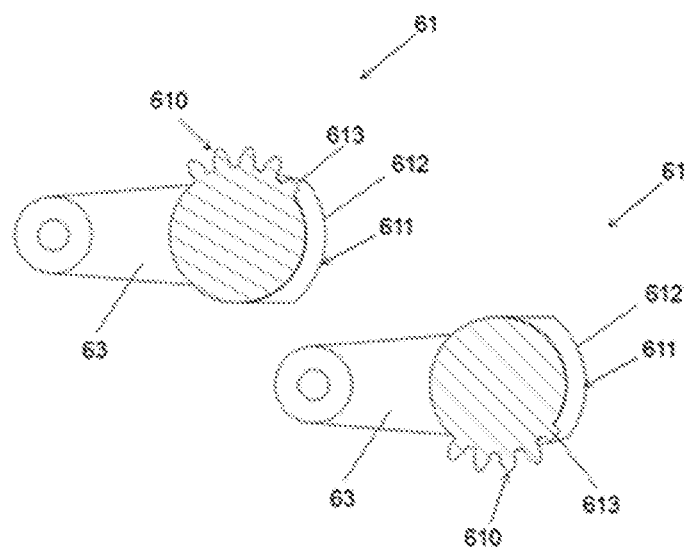
FIG. 12 shows a sectional view of the drive wheels of the transmission mechanism of the shutter device of FIG. 1.

In this first embodiment, each gear 60 comprises a drive wheel 61, shown in detail in FIGS. 11 and 12, coupled to the actuator 5 and comprising a notched part 610 and a blocking part 611. The drive wheels 61 are coupled to a cam 64 by means of arms 63. In other possible embodiments, the drive wheels of the gears can be coupled to one another by other transmission means.

Figure 13:
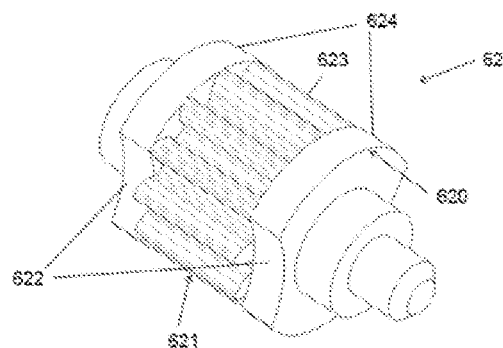
FIG. 13 shows a view of the driven wheels of the transmission mechanism of the shutter device of FIG. 1.
Figure 14:
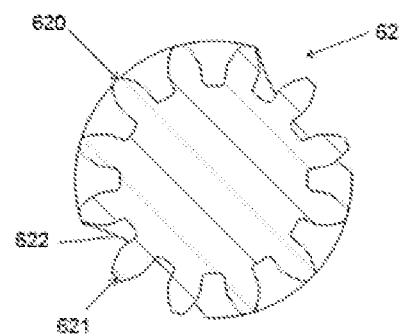
FIG. 14 shows a sectional view of the driven wheels of the transmission mechanism of the shutter device of FIG. 1.

Each gear 60 further comprises a driven wheel 62, shown in detail in FIGS. 13 and 14, coupled to the corresponding flap group 3 and 4 and comprising a notched part 620 and a blocking part 621. The movement of the wheels of each gear 60 is controlled at all times. The movement of the drive wheels 61 is controlled by means of the actuator 5 that is coupled to one of the drive gears 61. As the actuator 5 causes the drive gear 61 to which it is coupled to rotate, the other drive gear 61 is rotated by virtue of the drive gears being coupled by the cam 64. The driven wheels 62 are controlled at all times, since immediately after the notched part 620 of a driven wheel 62 just ends engaging the notched part 610 of the respective drive wheel 61, the driven wheel 62 is blocked by the drive wheel 61. Therefore, each of the driven wheels 62, and hence the flaps 30, 31, 40 and 41 coupled to said driven wheels 62, are always controlled because when the notches of the respective drive wheels and driven wheels are not engaged, they are immediately blocked.

The notched parts 610 and 620 of the drive wheel 61 and the driven wheel 62 are adapted for engaging one another such that the driven wheel 62 can transmit the movement of the actuator 5 to the respective flap group 3 and 4. The blocking parts 611 and 621 of the drive wheel 61 and the driven wheel 62 are adapted so that the driven wheel 62 is blocked by the drive wheel 61 when said blocking parts 611 and 621 interlock with one another.

The notched parts 610 and 620 and the blocking parts 611 and 621 of each gear 60 are distributed differently so as to achieve the sequential opening of said flap groups 3 and 4.

Figure 5:
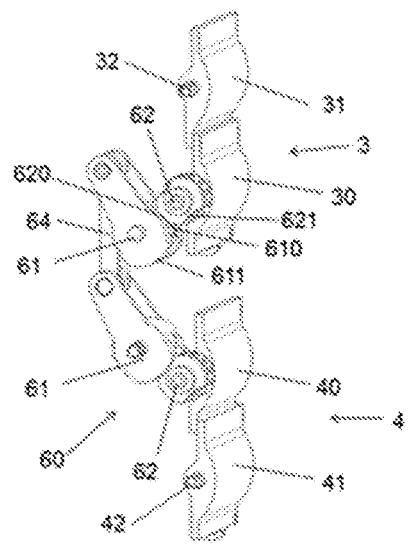
FIG. 5 shows a view of the transmission mechanism and the flaps of the shutter device of FIG. 1, wherein the flaps are in the airflow blocking position.
Figure 6:
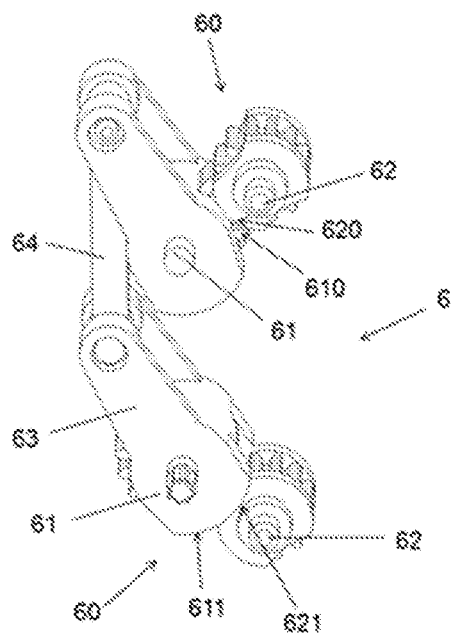
FIG. 6 shows a view of the transmission mechanism of the shutter device of FIG. 1 in the position shown in FIG. 5.

In this first embodiment, when the shutter device 1 is in the blocking position, as shown in FIGS. 5 and 6, the notched parts 610 and 620 of the gear 60 of the first flap group 3 are engaged, whereas the blocking parts 611 and 621 of the gear 60 of the second flap group 4 are interlocked with one another. Starting from said blocking position, if the actuator 5 starts to rotate in the opening direction, since the notched parts 610 and 620 of the gear 60 of the first flap group 3 are engaged, the movement of the actuator 5 will be transmitted from the drive wheel 61 through the cam 64 to the respective driven wheel 62, and will therefore cause the first flap group 3 to open. In contrast, since the blocking parts 611 and 621 of the gear 60 of the second flap group 4 are interlocked with one another, even though the respective drive wheel 61 will rotate, the driven wheel 62 will remain blocked.

Figure 7:
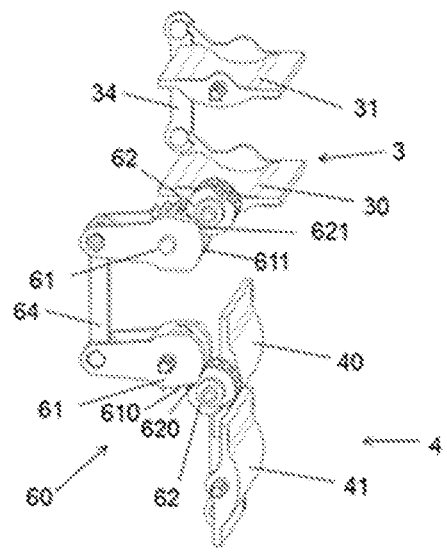
FIG. 7 shows a view of the transmission mechanism and the flaps of the shutter device of FIG. 1, wherein the flaps of the first flap group are in the open position and the flaps of the second flap group are in the airflow blocking position.
Figure 8:
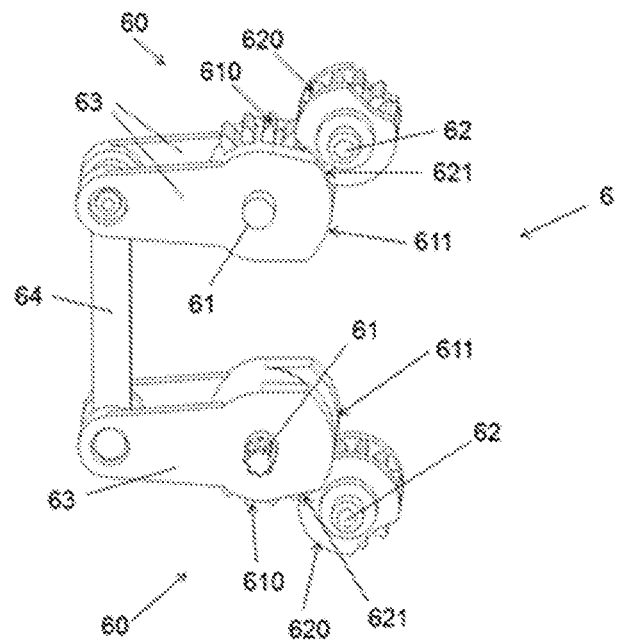
FIG. 8 shows a view of the transmission mechanism of the shutter device of FIG. 1 in the position shown in FIG. 7.

If the actuator 5 keeps rotating in the opening direction, there will come a time, shown in FIGS. 7 and 8, in which the first flap group 3 reaches its maximum opening point. At that time, the drive wheel 61 and the driven wheel 62 of the gear 60 of the first flap group 3 will have rotated to the point where the notched parts 610 and 620 will disengage and the respective blocking parts 611 and 621 will interlock with one another. Furthermore, the drive wheel 61 of the gear 60 of the second flap group 4 will be ready to engage the respective driven wheel 62. At this point, if the actuator 5 keeps rotating in the opening direction, the notched parts 610 and 620 of the gear 60 of the second flap group 4 will be engaged, and therefore the movement of the actuator 5 will be transmitted from the drive wheel 61 to the respective driven wheel 62, causing the second flap group 4 to open. In contrast, the blocking parts 611 and 621 of the gear 60 of the first flap group 3 will interlock with one another, and although the drive wheel 61 will keep rotating, the respective driven wheel 62 will remain blocked.

Figure 9:
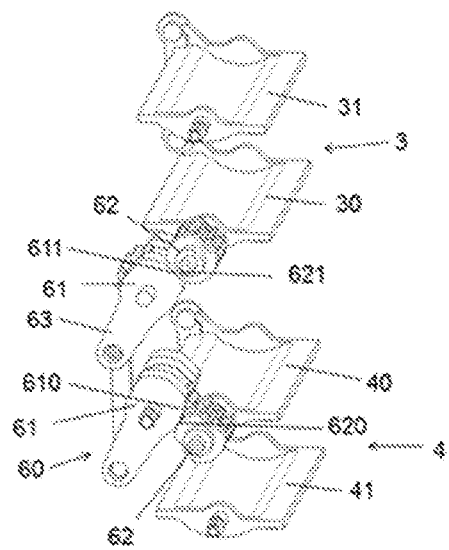
FIGS. 9 and 10 show a view of the transmission mechanism and the flaps of the shutter device of FIG. 1, when all the flaps are in the open position.
Figure 10:
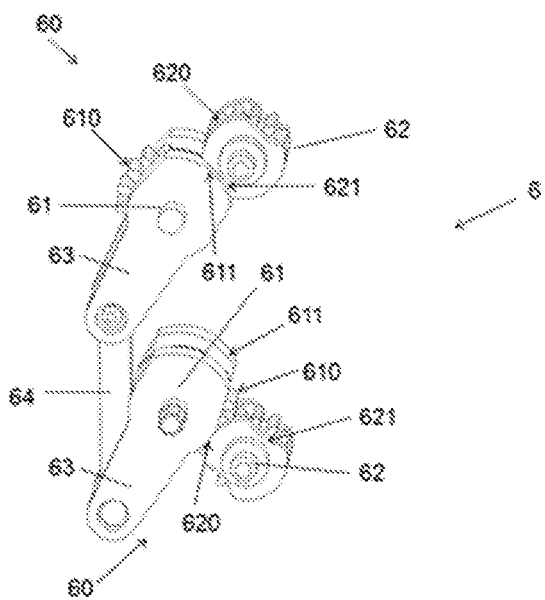

The actuator 5 may keep rotating in the opening direction until the second flap group 4 is completely open, which situation is shown in FIGS. 9 and 10.

For the flaps 30, 31, 40 and 41 to close, the actuator 5 must rotate in the direction opposite the opening direction, i.e., in the closing direction.

When the shutter device 1 is in the completely open position, shown in FIGS. 9 and 10, the notched parts 610 and 620 of the gear 60 of the second flap group 4 are engaged, whereas the blocking parts 611 and 621 of the gear 60 of the first flap group 3 are interlocked with one another. Starting from said open position, if the actuator 5 starts to rotate in the closing direction, since the notched parts 610 and 620 of the gear 60 of the second flap group 4 are engaged, the movement of the actuator 5 will be transmitted from the drive wheel 61 to the respective driven wheel 62, and will therefore cause the first flap group 4 to close. In contrast, since the blocking parts 611 and 621 of the gear 60 of the first flap group 3 are interlocked with one another, although the drive wheel 61 will rotate, the respective driven wheel 62 will remain blocked.

If the actuator 5 keeps rotating in the closing direction, there will come a time, shown in FIGS. 7 and 8, in which the second flap group 4 is in the blocking position. At that time the drive wheel 61 and the driven wheel 62 of the gear 60 of the second flap group 4 will have rotated to the point where the notched parts 610 and 620 of the gear 60 of the first flap group 3 disengage and the blocking parts 611 and 621 interlock with one another. Furthermore, the drive wheel 61 of the gear 60 of the first flap group 3 will be ready to engage the respective driven wheel 62. At this point, if the actuator 5 keeps rotating in the closing direction, the notched parts 610 and 620 of the gear 60 of the first flap group 3 will be engaged and therefore the movement of the actuator 5 will be transmitted from the drive wheel 61 to the driven wheel 62, causing the first flap group 3 to close. In contrast, the blocking parts 611 and 621 of the gear 60 of the second flap group 4 will interlock with one another, and although the drive wheel 61 will keep rotating, the respective driven wheel 62 will remain blocked. The actuator 5 may keep rotating in the closing direction until the first flap group 3 is in the blocking position, which situation is shown in FIGS. 5 and 6.

In other possible embodiments in which the distribution of the notched parts and the blocking parts is different, the opening and closure operations of the different flap groups could overlap. In other words, it could be possible to not have to wait for one of the groups to open or close entirely for another group to start to close or open. A shutter device with sequential overlapped opening could thereby be obtained.

In this first embodiment, the drive wheel 61 of one of the gears 60, specifically the drive wheel 61 of the gear 60 of the second flap group 4, is coupled to the output of the actuator 5. Furthermore, the drive wheels 61 of the gears 60 of the first and second flap groups 3 and 4 are coupled to one another by means of the cam 64, such that the movement of the actuator 5 is also transmitted to the drive wheel 61 of the gear 60 of the first flap group 3.

In this first embodiment, the driven wheel 62 of each gear 60 is coupled to some of the fixing pins 32 and 42 of one of the flaps 30 and 40 of each flap group 3 and 4, the flap 30 being the driving flap of the first flap group 3 and the flap 40 being the driving flap of the second flap group 4. The rest of the flaps 31 and 41 of flap groups 3 and 4 are coupled to the respective drive flap 30 and 40 by transmission means, in this case by means of a cam 34 and 44, respectively. In other possible embodiments, the driven wheel can transmit the movement directly to transmission means coupled to all the flaps of the group.

In this first embodiment, the blocking part 611 of the drive wheel 61 comprises two side abutment surfaces 612 and the blocking part 621 of the driven wheel 62 comprises two side support surfaces 622, the abutment surfaces 612 pressing on support surfaces 622 when both blocking parts 611 and 621 interlock with one another. In other possible embodiments, it would be sufficient for the blocking part of the drive wheel to comprise an abutment surface and the blocking part of the driven wheel to comprise a support surface. Nor is it essential for them to be located on the sides, provided that the effect of the abutment surface pressing on said support surface is achieved when both blocking parts interlock with one another.

In this first embodiment, the notched part 610 of the drive wheel 61 of the gear 60 of the first flap group 3 may comprise a smaller notch 613 compared to the rest of the notches at the end of the notched part 610, such that it makes the engaging and disengaging function with respect to the driven wheel 62 of said gear 60 easier.

In this first embodiment, the notched part 610 of the drive wheel 61 of the gear 60 of the second flap group 4 may comprise a smaller notch 613 compared to the rest of the notches at the beginning of the notched part 610, such that it makes the engaging and disengaging function with respect to the driven wheel 62 of said gear 60 easier.

In other possible embodiments, the notched part 610 of the drive wheel 61 can comprise a smaller notch 613 compared to the rest of the notches both at the beginning and at the end of the notched part 610 to make the engaging and disengaging function with respect to the other wheel of the gear 60 easier. Furthermore, the notched part of the driven wheel could be the part comprising a smaller notch compared to the rest of the notches at the beginning and/or at the end of the notched part.

In this embodiment, the drive wheel 61 of each gear 60 comprises a central area 614 and two side areas 615 arranged on both sides of the central area 614. The notched part 610 is arranged in the central part 614 and the abutment surfaces 612 are arranged in the side areas 615. The arms 63 extend from the side areas 615.

In this embodiment, the driven wheel 62 of each gear 60 comprises a central area 623 and two side areas 624 arranged on both sides of the central area 623. The notched part 620 is arranged in the central part 623. In this embodiment, the entire central part comprises notches although in other possible embodiments it would be enough to arrange the notched part 620 only in the area required for engaging the respective drive wheel 61. The side support surfaces 622 are arranged in the side areas 624.

Preferably, the structure 2 and the flaps 30, 31, 40 and 41 of the shutter device 1, like the transmission mechanism 6, are made of plastic. Preferably, said parts are made by compression injection molding.

Figure 16:
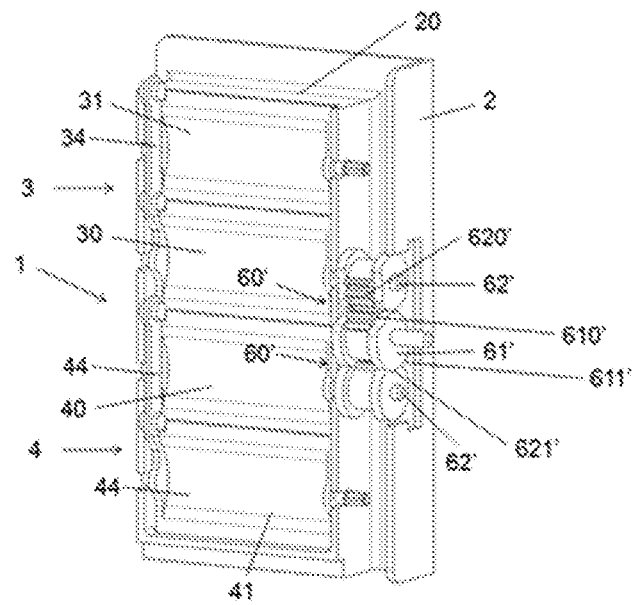
FIG. 16 shows a rear view of the shutter device according to a second embodiment, wherein the flaps are in the airflow blocking position.
Figure 17:
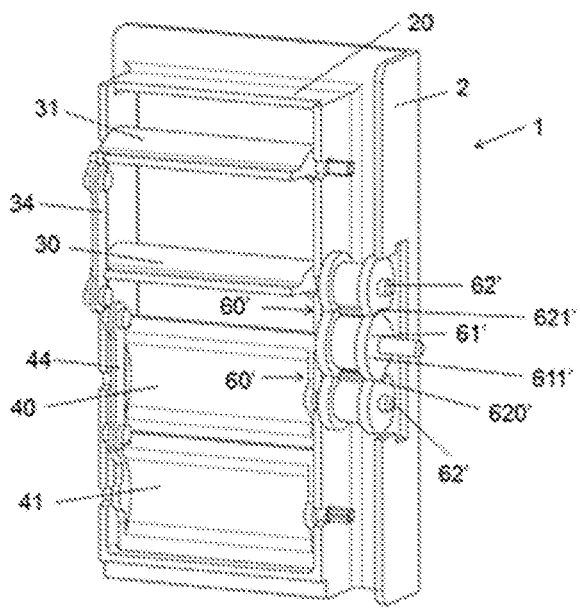
FIG. 17 shows the shutter device of FIG. 16, wherein the flaps of the first flap group are in the open position and the flaps of the second flap group are in the airflow blocking position.
Figure 18:
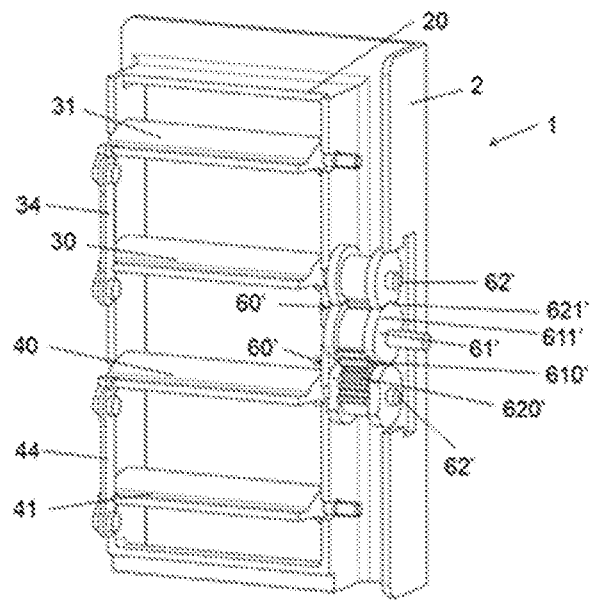
FIG. 18 shows the shutter device of FIG. 16, wherein all the flaps are in the open position.

FIGS. 16 to 18 show a second embodiment of the shutter device 1 for a front grille of a motor vehicle.

The shutter device 1 of this second embodiment differs from the shutter device 1 of the first embodiment in the configuration of the transmission mechanism 6' and in that the structure 2 comprises a single frame 20.

The shutter device 1 of the second embodiment comprises a structure 2 comprising a single frame 20 in which a first flap group 3 and a second flap group 4 are arranged. The flaps 30, 31, 40 and 41, coupled in a pivoting manner to said frame 20, are adapted for pivoting between an airflow blocking position, in which the passage of air is not allowed, and an open position, in which the passage of air is allowed. In this embodiment, the flaps 30 and 31 of the first flap group 3 pivot in a synchronized manner, whereas the flaps 40 and 41 of the second flap group 4 pivot in a synchronized manner.

The transmission mechanism 6' of this second embodiment comprises two gears 60' sharing one and the same drive wheel 61'. Said drive wheel 61' is coupled to the output of the actuator 5.

Figure 19:
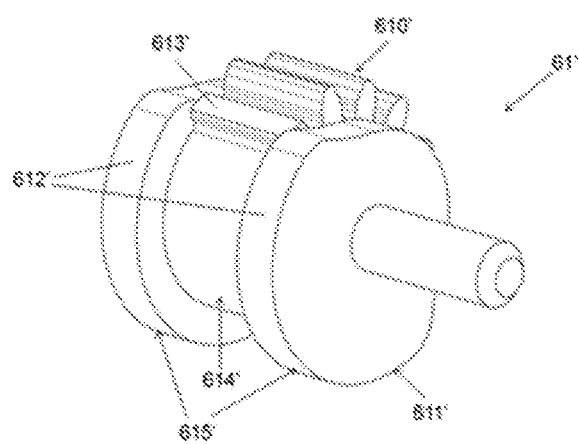
FIG. 19 shows a view of the drive wheel of the transmission mechanism of the shutter device of FIG. 16.
Figure 20:
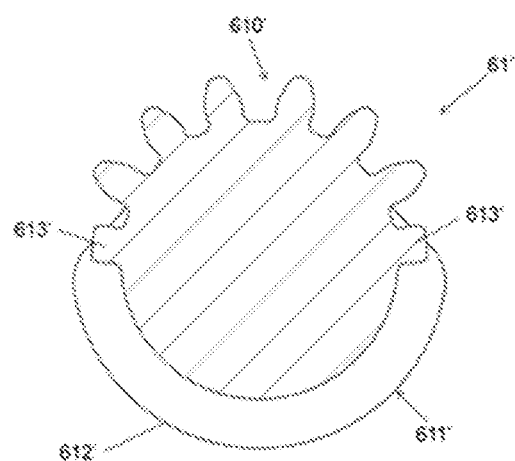
FIG. 20 shows a sectional view of the drive wheel of the transmission mechanism of the shutter device of FIG. 16.

In this second embodiment, the drive wheel 61', shown in detail in FIGS. 19 and 20, comprises a central area 614' and two side areas 615' arranged on both sides of the central area 614'. The notched part 610' is arranged in the central part 614'. The abutment surfaces 612' are arranged in the side areas 615'.

In this second embodiment, the notched part 610' of the drive wheel 61' may comprise a smaller notch 613' compared to the rest of the notches both at the beginning and at the end of the notched part 610' to make the engaging and disengaging function with respect to the driven wheels 62' easier.

The driven wheels 62' of this embodiment are similar to those of the first embodiment, so describing them again is considered to be unnecessary.

In this second embodiment, when the shutter device 1 is in the blocking position, as shown in FIG. 16, the notched part 620' of the driven wheel 62' of the gear 60' of the first flap group 3 is engaged with the notched part 610' of the drive wheel 61', whereas the blocking part 621 of the driven wheel 62' of the gear 60' of the second flap group 4 is blocked by the blocking part 611' of the drive wheel 61'. Starting from said blocking position, if the actuator 5 starts to rotate in the opening direction, since the notched part 620' of the driven wheel 62' of the gear 60' of the first flap group 3 is engaged with the notched part 610' of the drive wheel 61', the movement of the actuator 5 will be transmitted from the drive wheel 61' to the driven wheel 62' and will therefore cause the first flap group 3 to open. In contrast, since the blocking part 621' of the driven wheel 62' of the gear 60' of the second flap group 4 is blocked by the blocking part 611' of the drive wheel 61', although the drive wheel 61 will rotate, said driven wheel 62' will remain blocked.

If the actuator 5 keeps rotating in the opening direction, there will come a time, shown in FIG. 17, in which the first flap group 3 reaches its maximum opening point. At that time the drive wheel 61' and the driven wheel 62' of the gear 60' of the first flap group 3 will have rotated to the point where the blocking part 621' of the driven wheel 62' of the gear 60' of the first flap group 3 interlocks with the blocking part 611' of the drive wheel 61', and the driven wheel 62' of the gear 60 of the second flap group 4 will be ready to engage the notched part 610' of the drive wheel 61'. At this point, if the actuator 5 keeps rotating in the opening direction, the notched part 620' of the driven wheel 62' of the gear 60' of the second flap group 4 will engage the notched part 610' of the drive wheel 61', and therefore the movement of the actuator 5 will be transmitted from the drive wheel 61' to the driven wheel 62', causing the second flap group 4 to open. The blocking part 621' of the driven wheel 62' of the gear 60' of the first flap group 3 and blocking part 611' of the drive wheel 61' will interlock with one another, and although the drive wheel 61' will keep rotating, the respective driven wheel 62' will remain blocked.

The actuator 5 may keep rotating in the opening direction until the second flap group 4 is completely open, which situation is shown in FIG. 18.

For the flaps 30, 31, 40 and 41 to close, the actuator 5 must rotate in the direction opposite the opening direction, i.e., in the closing direction.

When the shutter device 1 is in the completely open position, the notched part 620' of the driven wheel 62' of the gear 60' of the second flap group 4 is engaged with the notched part 610' of the drive wheel 61', whereas the blocking part 621 of the driven wheel 62' of the gear 60' of the first flap group 3 is blocked by the blocking part 611' of the drive wheel 61'. Starting from said blocking position, if the actuator 5 starts to rotate in the closing direction, since the notched part 620' of the driven wheel 62' of the gear 60' of the second flap group 4 is engaged with the notched part 610' of the drive wheel 61', the movement of the actuator 5 will be transmitted from the drive wheel 61' to the respective driven wheel 62' and will therefore cause the second flap group 4 to close. In contrast, since the blocking part 621' of the driven wheel 62' of the gear 60' of the first flap group 3 is blocked by the blocking part 611' of the drive wheel 61', although the drive wheel 61' will rotate, the respective driven wheel 62' will remain blocked.

If the actuator 5 keeps rotating in the closing direction, there will come a time, shown in FIG. 17, in which the second flap group 4 is in the blocking position. At that time the drive wheel 61' and the driven wheel 62' of the gear 60' of the second flap group 4 will have rotated to the point where the blocking part 621' of the driven wheel 62' of the gear 60' of the second flap group 4 interlocks with the blocking part 611' of the drive wheel 61', and the driven wheel 62' of the gear 60' of the first flap group 3 will be ready to engage the notched part 610' of the drive wheel 61'. At this point, if the actuator 5 keeps rotating in the closing direction, the notched part 620' of the driven wheel 62' of the gear 60' of the first flap group 3 engages the notched part 610' of the drive wheel 61', and therefore the movement of the actuator 5 will be transmitted from the drive wheel 61' to the driven wheel 62', causing the first flap group 3 to close. The blocking part 611 of the drive wheel 61 and the blocking part 621 of the driven wheel 62' of the gear 60' of the second flap group 4 will interlock with one another, and although the drive wheel 61' will keep rotating, the respective driven wheel 62' will remain blocked.

Although the transmission mechanism 6' of this embodiment is different from that of the first embodiment, a transmission mechanism 6 like the one of the first embodiment could also be used for a solution in which a plurality of flap groups are coupled in a single frame.

The rest of the features are similar to the features of the first embodiment, so describing them again is considered to be unnecessary.

The present disclosure also relates to a motor vehicle comprising the described shutter device.

What is claimed is:

1. A shutter device comprising:
a first flap rotatable between an open position and a closed position,
a second flap rotatable between an open position and a closed position,
a first driven wheel that rotates and is coupled to the first flap, the first driven wheel including a notched part comprising a plurality of notches and a blocking part, a rotation of the first driven wheel causing a rotation of the first flap between the open and closed positions,
a second driven wheel that rotates and is coupled to the second flap, the second driven wheel including a notched part comprising a plurality of notches and a blocking part, a rotation of the second driven wheel causing a rotation of the second flap between the open and closed positions,
a first drive wheel that rotates, the first drive wheel including a notched part comprising a plurality of notches and a blocking part, the notched part of the first drive wheel being engageable with the notched part of the first driven wheel to cause a rotation of the first driven wheel when the first drive wheel rotates, the first driven wheel being prevented to rotate when the blocking part of the first drive wheel engages the blocking part of the first driven wheel,
a second drive wheel that rotates, the second drive wheel including a notched part comprising a plurality of notches and a blocking part, the notched part of the second drive wheel being engageable with the notched part of the second driven wheel to cause a rotation of the driven wheel when the second drive wheel rotates, the second driven wheel being prevented to rotate when the blocking part of the second drive wheel engages the blocking part of the second driven wheel,
an actuator coupled to the first drive wheel and to the second drive wheel,
the notched parts and blocking parts of the first drive wheel and first driven wheel and the notched parts and blocking parts of the second drive wheel and second driven wheel being arranged in a manner that results in a sequential opening or closing of the first and second flaps when the first and second drive wheels are rotated.

2. The shutter device according to claim 1, further comprising a first cam that couples the first drive wheel to the second drive wheel, and wherein the actuator is coupled to the first drive wheel and is configured to impart a rotational movement to the first drive wheel in both a clockwise and counter-clockwise direction.

3. The shutter device according to claim 2, wherein the actuator is directly coupled to the first drive wheel.

4. The shutter device according to claim 1, wherein the notched part of each of the first and second drive wheels extends only partially about a circumference of the respective first and second drive wheels.

5. The shutter device according to claim 1, further comprising a third flap that moves together with first flap, the first and third flaps being coupled by a second cam.

6. The shutter device according to claim 5, wherein the first flap is a driving flap that is coupled to the first driven wheel, the movement of the first flap being imparted to the third flap by the second cam.

7. The shutter device according to claim 1, wherein the first and second flaps are rotationally mounted in a common frame.

8. The shutter device according to claim 1, wherein the first flap is rotationally mounted in a first frame and the second flap is rotationally mounted in a second frame.

9. The shutter device according to claim 1, wherein the blocking part of each of the first and second driven wheels comprises a recess in which the respective blocking part of the first and second drive wheels resides when the blocking part of each of the first and second driven wheels are respectively engaged with the blocking part of each of the first and second drive wheels.

10. The shutter device according to claim 2, wherein the first drive wheel includes an arm and the second drive wheel includes an arm, the first cam having a first end and a second end with the first end being coupled to the arm of the first drive wheel and the second end being coupled to the arm of the second drive wheel.

11. The shutter device according to claim 1, wherein the plurality of notches of at least one of the first driven wheel, second driven wheel, first drive wheel and second drive wheel has a first end and a second end with a first notch located at an end of the plurality of notches being smaller than the remainder of the plurality of notches.

12. The shutter device according to claim 1, wherein the blocking part of the first drive wheel engages the blocking part of the first driven wheel only when the blocking part of the second drive wheel is not engaged with the blocking part of the second driven wheel.

* * * * *